United States Patent [19]

Kidd et al.

[11] Patent Number: 5,642,999

[45] Date of Patent: Jul. 1, 1997

[54] VEHICLE DOOR MODULAR CONNECTION SYSTEM

[75] Inventors: Richard Louis Kidd, Stow; Philip Jerome Engler, Leavittsburg; Marc Lynn Mansell, Youngstown, all of Ohio

[73] Assignee: General Motors Corporation, Detroit, Mich.

[21] Appl. No.: 553,731

[22] Filed: Oct. 23, 1995

[51] Int. Cl.$^6$ .................................................. H01R 33/00
[52] U.S. Cl. .................................................. 439/34; 439/364
[58] Field of Search ........................... 439/34, 364

[56] References Cited

U.S. PATENT DOCUMENTS

| | | | |
|---|---|---|---|
| 3,174,576 | 3/1965 | Woofter et al. | 180/90 |
| 3,706,067 | 12/1972 | Hanson | 339/45 M |
| 4,348,071 | 9/1982 | Hsieh | 339/75 MP |
| 4,352,538 | 10/1982 | Fowler | 339/126 R |
| 4,474,420 | 10/1984 | Nestor | 339/116 MF |
| 4,684,190 | 8/1987 | Clark et al. | 439/364 |
| 4,848,829 | 7/1989 | Kidd | 296/152 |
| 4,869,670 | 9/1989 | Ueda et al. | 439/34 |
| 4,942,499 | 7/1990 | Shibata et al. | 361/428 |
| 4,943,109 | 7/1990 | Skrbina et al. | 296/146 |
| 4,943,241 | 7/1990 | Watanabe et al. | 439/34 |
| 4,954,085 | 9/1990 | Inoue et al. | 439/34 |
| 5,248,259 | 9/1993 | Naito et al. | 439/34 |
| 5,460,530 | 10/1995 | Toba et al. | 439/34 |

*Primary Examiner*—Neil Abrams
*Assistant Examiner*—Eugene G. Byrd
*Attorney, Agent, or Firm*—Ernest E. Helms

[57] ABSTRACT

A vehicle door and signal connection arrangement is provided including a first panel; a first connective member having a body mounting a plurality of leads extending therethrough, the first connective member having a bore extending therethrough and also being rigidly connected to the first panel; a second panel extending generally laterally adjacent the first panel with arms extending toward the first panel, at least one of the arms having a finger; a second connective member having a body mounting a plurality of leads extending therethrough for mating with the leads of the first connective member, the second connective member having a bore extending therethrough aligned with the bore of the first connective member, the second connective member being slidably mounted on the arms of the second panel and entrapped on the arms by the finger; and a fastener extending through the first and second connective members, causing the connective members to mate with one another and also causing the second connective member to contact the finger pulling the second panel to positionally set the second panel with respect to the first panel.

6 Claims, 5 Drawing Sheets

VEHICLE DOOR MODULAR CONNECTION SYSTEM

FIELD OF THE INVENTION

The field of the present invention is that of modular connector arrangements for electrical systems suitable for automotive vehicles. More particularly, the present invention is particularly useful in establishing electrical connections between components and/or controls mounted on an interior trim panel of a vehicle door with the remainder of a vehicle electrical system.

BACKGROUND OF THE INVENTION

Most automotive vehicle doors are comprised of three separate panels. An outer typically metallic, plastic or fiberglass panel is joined to an inner metal panel which forms an envelope providing general structural integrity of the vehicle door.

Mounted on the inner panel is a vehicle interior trim panel which is typically formed from a rigid plastic and is covered with a vinyl or cloth cover material to form a surface which is exposed to the vehicle occupant. The trim panel typically mounts various electrical connections and controls including, but not limited to, musical speakers, interior lighting, switches controlling the operation of the window, door locks and in some instances adjustment of a vehicle seat.

Typically, the various switches and controls and other electrical components on the trim panel have attached lead wires which are then joined via a separate individual electrical connector to a wire harness. The wire harness extends through the interior of the door and is then extended out of the door into the interior of the vehicle and thereby is connected to the remainder of the vehicle electrical system. As is apparent to those familiar with the art, as the number of component/control electrical wires which must be connected to the wire harness increases, the cost of the vehicle assembly will increase as well as providing greater opportunities for faulty electrical connections. Additionally, rattles caused by improper wire routing within the door may increase.

It would be desirable that all electrical connections between the structural door and the interior trim panel be made at one location. Additionally, it would be desirable that a mechanical attachment of the trim panel and the structural door be established with the electrical connection.

To meet the above-noted needs and desires, the present invention is brought forth. The present invention provides a modular electrical connective arrangement which allows all electrical connections between a door trim panel and the wire harness in the structural door to be made at a single location while additionally providing a mechanical attachment of the trim panel to the structural door.

DESCRIPTION OF THE PREFERRED EMBODIMENT

Figure 1:
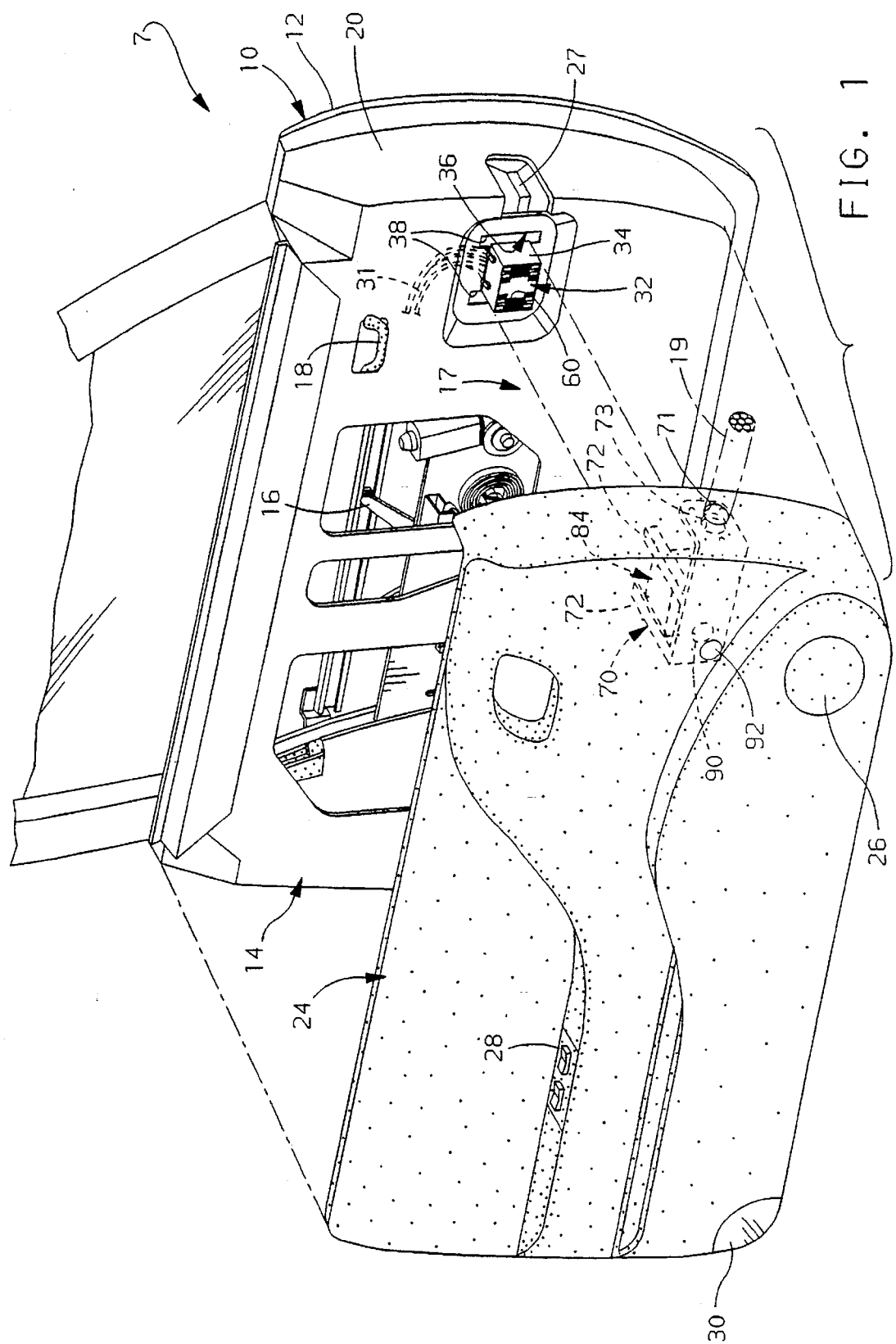
FIG. 1 is an exploded perspective view of an automotive interior door utilizing the connection arrangement according to a preferred embodiment of the present invention.
Figure 2:
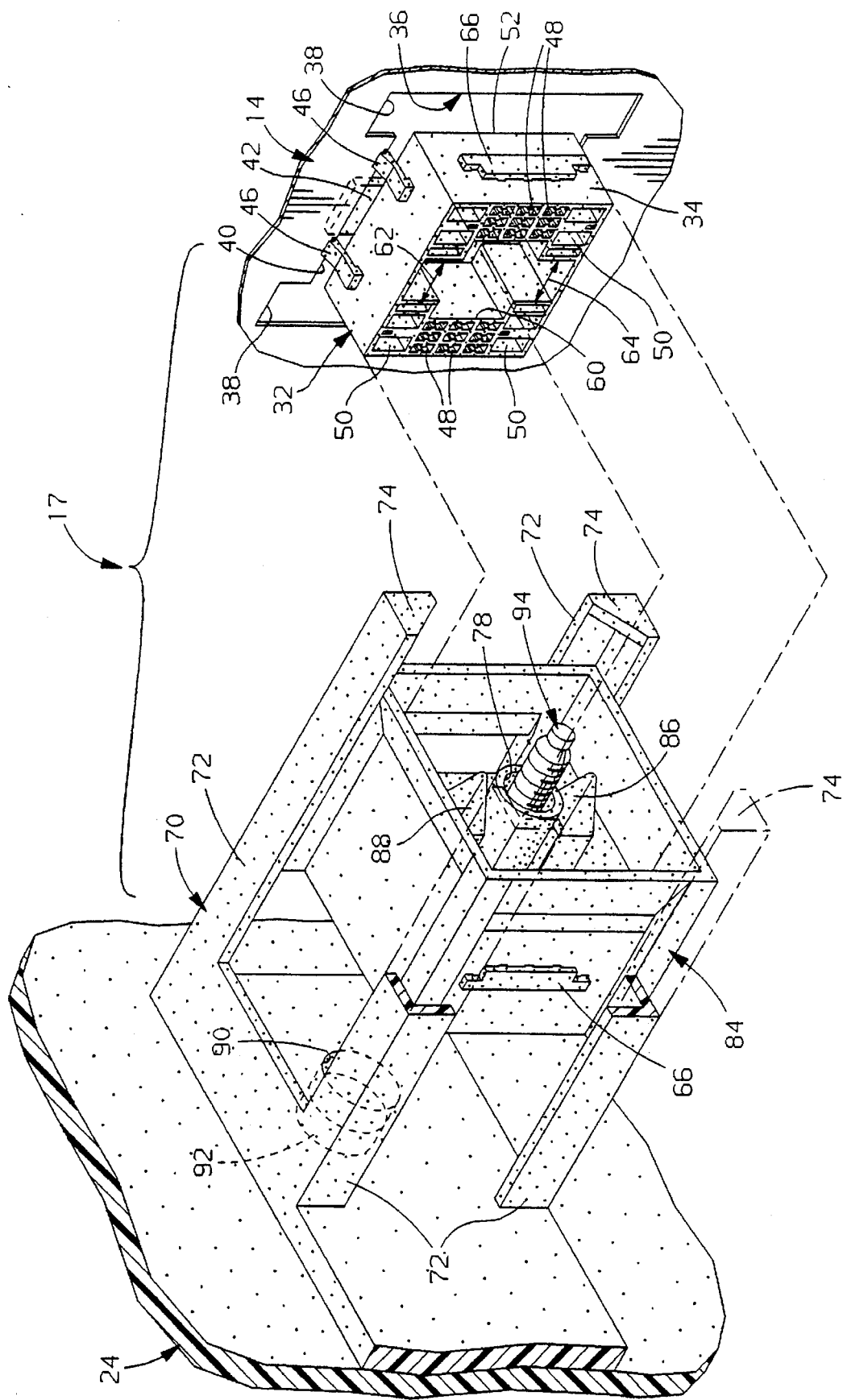
FIG. 2 is an enlarged perspective view of the connective arrangement shown in FIG. 1 with the first and second members of the connective arrangement exploded away from one another.

Referring to FIG. 1, a vehicle door and connection arrangement 7 has a door 10 having an exterior metallic panel 12 joined to an inner panel 14 which is spaced therefrom. Together, the panels 12 and 14 form the major structural components of the vehicle door 10 and are typically metallic but in virtually all cases are generally rigid. Positioned within the vehicle door 10 is a window regulator mechanism 16, a door latch 18 and other various mechanical and nonmechanical components.

Facing an occupant of the interior of a vehicle, there is an interior trim panel 24. The interior trim panel 24 is typically formed from a generally rigid plastic which is covered with a cloth or vinyl covering having a padding material interposed therebetween. The trim panel 24 will typically have mounted thereupon a speaker 26 and a group of electrical controls 28. Additionally, many vehicle doors will have lights (not shown) to illuminate the control switches 28 or lights 30 to provide both interior lighting and lighting upon the vehicle door to alert oncoming cars that a vehicle door has been opened.

Figure 3:
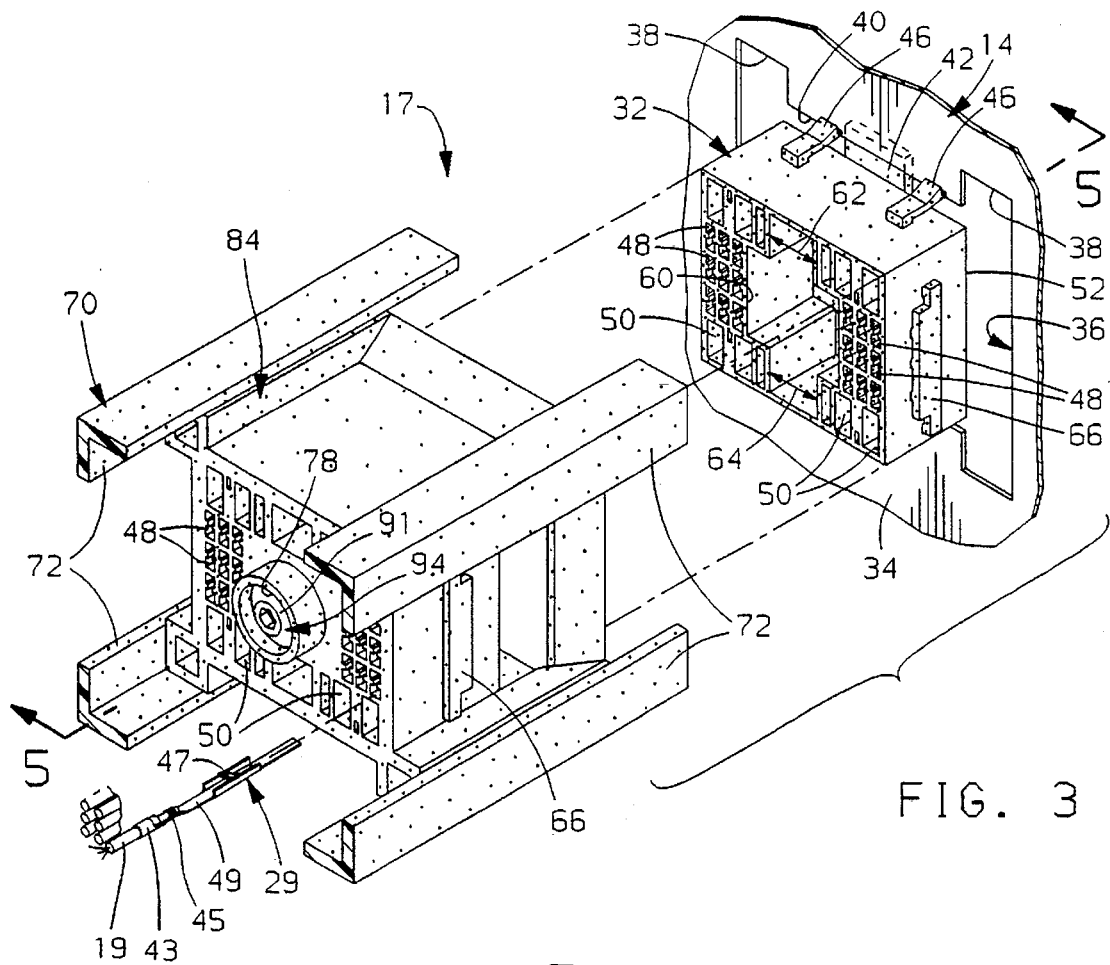
FIG. 3 is a view similar to that of FIG. 2, illustrating a rear portion of the second connective member.
Figure 4:
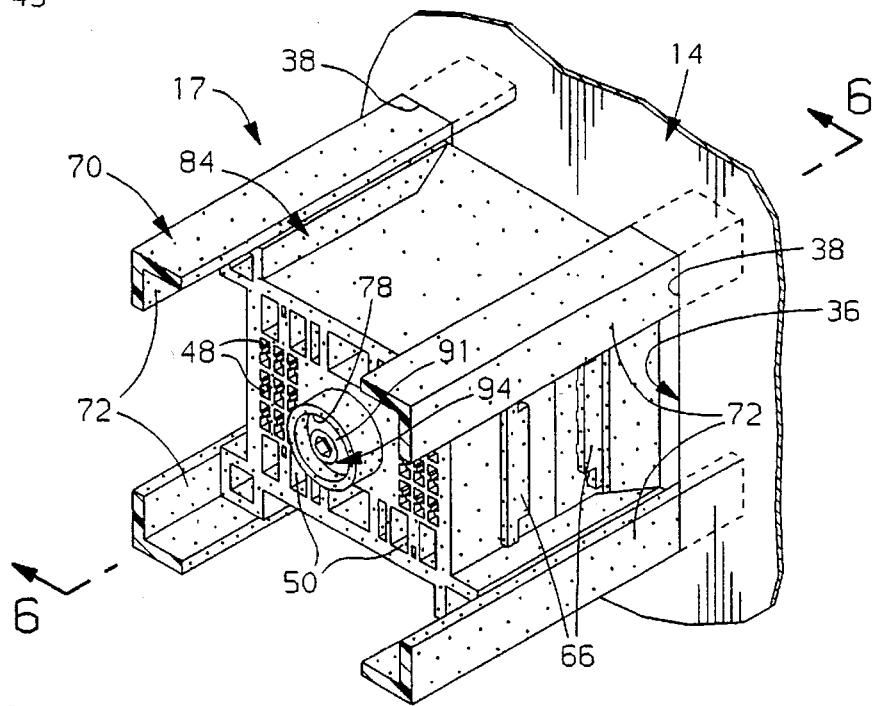
FIG. 4 is a view similar to that of FIG. 3 with the connective members mated with one another.
Figure 5:
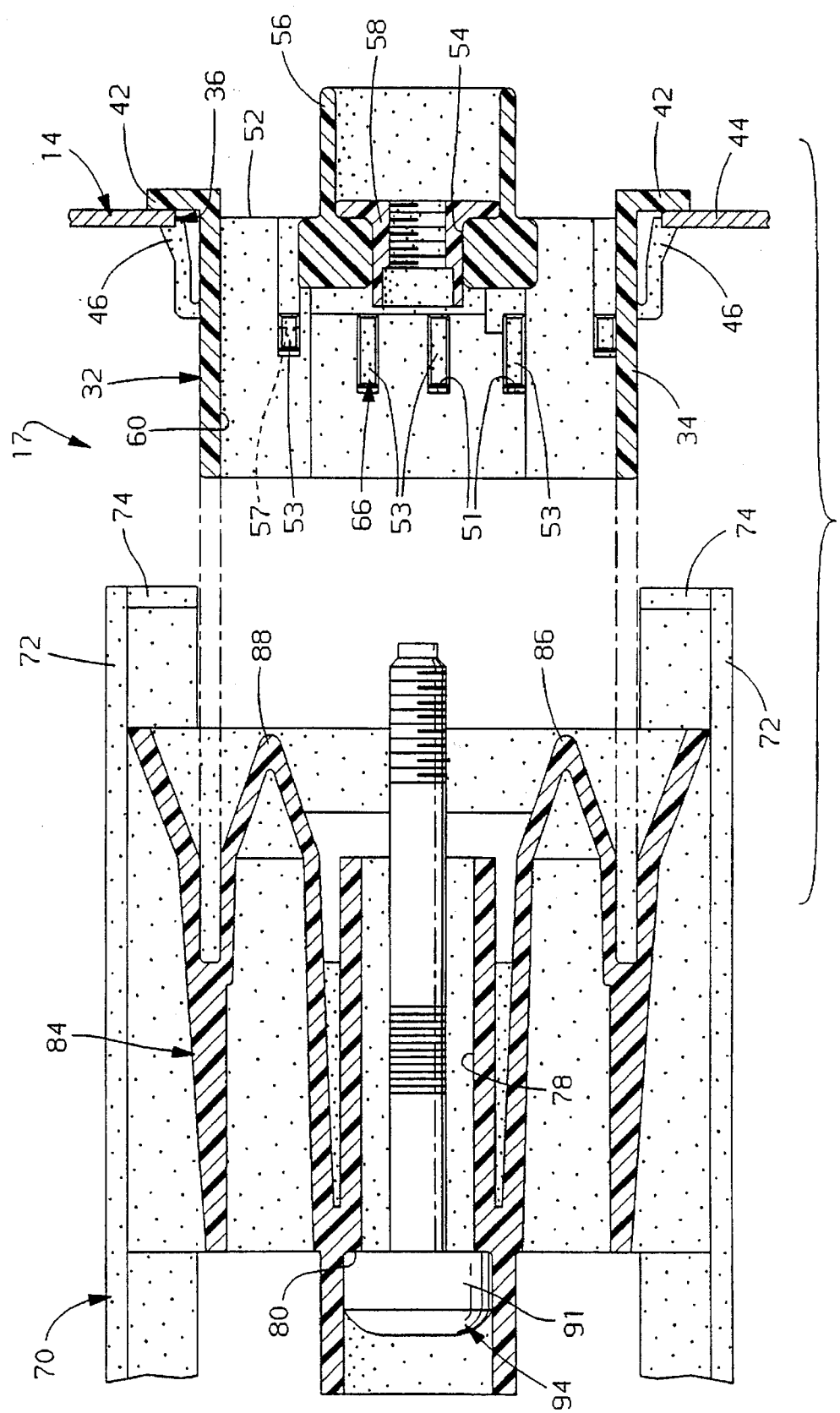
FIGS. 5 and 6 are views taken along lines 5—5 and 6—6 of FIGS. 3 and 4, respectively.
Figure 6:
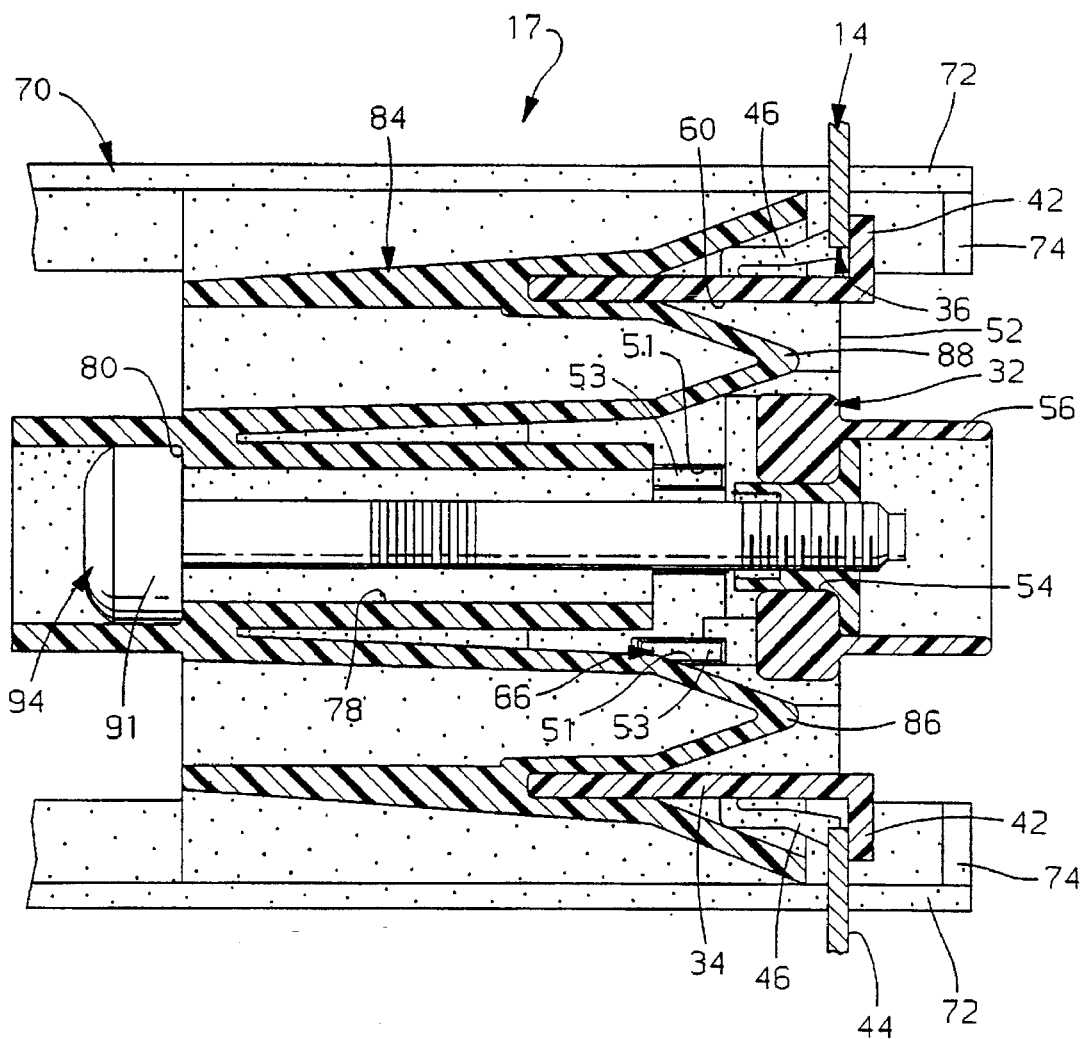

The trim panel 24 optionally has an L-shaped portion 25 extending outwardly which covers a substantial portion of a forward end 20 which extends between the exterior panel 12 and the inner panel 14. The trim panel 24 has fixably connected thereto a bracket 70 is integral to 24 or is fixably connected to the trim panel by gluing, riveting or integrally molded into/or a part of plastic panel 24 and has integrally connected thereto four fingers 72. A wiring harness 19 extending from the trim panel 24 and is then routed through an opening 73 of the bracket and through an indentation 27 provided in the forward end 20 of the door to allow clearance for wiring harness and forward L shape portion of 70. The component wires of the wiring harness 19 then connects to the terminals 29 (FIG. 3) which are located within a connector 17.

Referring additionally to FIGS. 2 through 6, the connector 17 in the arrangement 7 according to the present invention provides a modular electrical connection from the electrical controls and components from the trim panel 24 and wiring harness 19 to the electrical components mounted in the door 10 (between the exterior and inner panels 12, 14). The connector 17 has a first connector member 32. Connector member 32 has a main body 34 molded from plastic material. The first connector member 32 fits within a generally H-shaped aperture 36 formed within the inner panel 14. The aperture 36 has two parallel slots 38 which are joined by a cross slot 40. The first connector member 32 has flange members 42 which are fitted on an outer surface 44 of the inner panel 14 (see FIG. 5) and are held in position by snap arms 46 to fixably connect the first connector member to the panel 14.

The first connector member 32 has a series of apertures 48 for the positioning of various electrical signal or power leads, often referred to as terminals (not shown). The leads may be male or female and typically will be female. Additionally, there are various apertures 50 which pass through the first connector member 32 to optionally allow for passage of optical leads.

The first connector member 32 has an outer end 52 for connection to a wiring harness 31 which extends into the cavity formed between the panels 14 and 12 connecting with the various electrical components such as the window motor 16. The first connector member 32 has extending therethrough a multi-dimensional bore 54 surrounded at its rearward end by a mounted tail washer retainer 56. Inserted within the mounting tail 56 is an interiorally threaded washer 58. To ensure proper orientation upon connection with the second connector member 84, the first connector member 32 may have a cross-shaped inner slot 60 having optionally different upper and lower cross dimensions 62 and 64 or an alternative alignment feature.

As mentioned previously, the bracket 70 has fingers 72 which have inner stops 74 which may be used to prevent the first connector member 84 from falling out during shipment or assembly and for a secondary function to be described later. The fingers 72 slidably mount the second connector member 84 and exert upon the connector member 84 a slight compliant force. The second connector member 84 has a body comprised of material similar to that of the first connector member 32. In like manner, the second connector member 84 has a series of through apertures 48 and 50 aligned with the apertures 48 and 50 of the first connector member 32 to allow the leads of the second connector member to mate with the leads of the first connector member and extend through the body of the second connector member.

Both the female terminals of the first connector member 32 and the male terminal 29 have an insulation crimp portion 43, a conductive crimp portion 45, a terminal lock 47 and a gap 49 between the terminal lock and the conductive crimp portion 45. The apertures 48 have generally centrally located projecting studs which depress the terminal locks 47 upon insertion and then, as the terminal is further inserted, become a stop preventing the terminal from being withdrawn. Each connector member 32 and 84 has a series of cross apertures 51 for insertion of combs 66 to provide secondary locking assurance as well as to hold the terminals in a more fixed position by extending fingers 53 into the gap 49 of the terminals. The connector members 34 and 84 each have a short stud 57 (FIG. 5) which has a snap-fit connection with one of the fingers 53.

The second connector member also has a multi-dimensional bore 78 having a shoulder 80. The second connector member has alignment prongs 86 and 88 which extend into the cross-shaped aperture 60 of the first connector member 32. The alignment prongs are both tapered to lead in the second connector member in case of possible misalignment between the parts when item 24 mates to item 10 or mating 32 to 84. The bracket 70 has an aperture 90 aligned with the bore 78 and a plug 92 placed in an inconspicuous portion of the trim panel 24 to allow for a torquing tube or, screwdriver to reach a head 91 of a fastener 94. In addition, boss 131 provides clearance for wires exiting item 84 and trim panel 24.

Upon assembly of the trim panel 24 to the intermediate panel 14, the fingers 72 will be pointed to approximate alignment with the enlarged portion 38 of the aperture 36 in the intermediate panel and the second connector member 84 will be brought into close proximity to the first connector member 32. The tightening of the fastener 94 will cause the threaded end of the fastener 94 to engage with the threaded insert 58, pulling the connector members 32 and 84 toward one another.

As the second connector member 84 is pulled toward the first connector member 32, sliding within the fingers 72. Upon hitting the stop 74, further tightening of the screw will also pull the interior trim panel 24. By extending the fingers 72 into the extreme portion of the parallel slots 38, the fingers will not be allowed to extend outwardly. Therefore, further movement of the second connector member 84 will continue until mating with the respective terminals is achieved while simultaneously affixing the trim panel 24 with the inner panel 14. Therefore, electrical and mechanical connection is established. As is well known to those familiar with the art, electrical components 28, 30 and 26 will typically be pre-wired to the interior trim panel 24. The additional assured locking and additional assurance provided by the comb 66 will prevent the terminals from being backed out of position upon the mating of the first and second connector members 32 and 84.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A vehicle door and signal connection arrangement comprising:

a first door panel having defined therein a H-shaped aperture defined by two parallel slots joined by a cross slot;

a first connective member having a body mounting a plurality of leads extending therethrough, the first connective member having a bore extending therethrough and also being received in the cross slot and rigidly connected to the first door panel;

a second door panel extending generally laterally adjacent the first door panel with fingers extending toward the first door panel, at least one of the fingers having a stop formed therein, at least a first and second finger having a portion received in one of the respective parallel slots;

a second connective member having a body mounting a plurality of leads extending therethrough for mating with the leads of the first connective member, the second connective member having a bore extending therethrough aligned with the bore of the first connective member, the second connective member being slidably mounted on the fingers of the second door panel and entrapped on the fingers by the stop; and a fastener extending through the first and second connective members, causing the connective members to mate with one another and pulling the second door panel to positionally set the second door panel with respect to the first door panel.

2. A vehicle door and signal connector arrangement as described in claim 1 comprising four spaced apart fingers.

3. A vehicle door and signal connector arrangement as described in claim 1 further including a comb which is inserted into aligned apertures on one of the connective members, preventing the separation of the connective member from an associated wiring harness.

4. A vehicle door and signal connector arrangement as described in claim 1 wherein the second panel is a polymeric interior door trim panel.

5. A vehicle door and signal connector arrangement as described in claim 1 wherein one of the connective members has alignment prongs to align that connective member with the other connective member upon joining the first and second connective members together.

6. A vehicle door and signal connector arrangement as described in claim 1 wherein the fingers on the second door panel are mounted to a bracket fixably connected to the second door panel.

* * * * *